Feb. 10, 1925. 1,526,058

W. E. FOWLER, JR., ET AL

BRAKE BEAM

Filed July 2, 1923 3 Sheets-Sheet 1

WITNESSES
J. Herbert Bradley.

INVENTORS
William E. Fowler Jr
and Charles J. Perkins
by Damus L. Wolcott
Atty

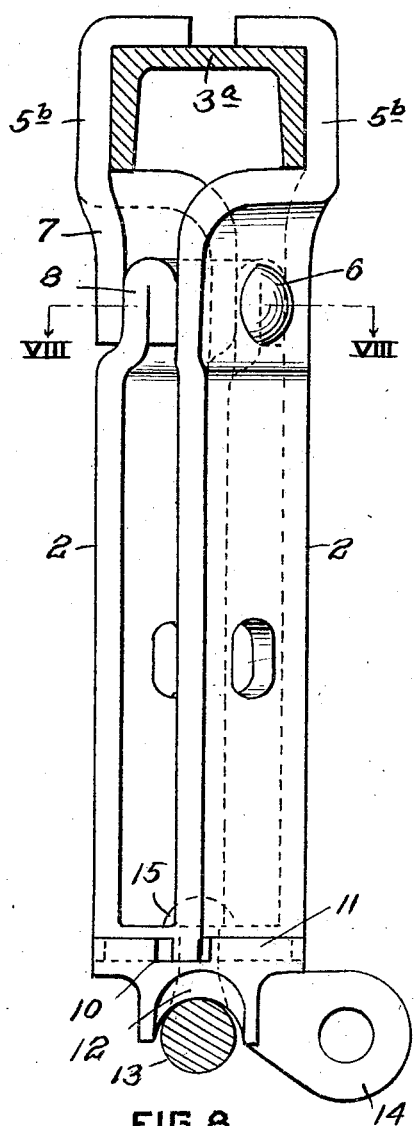
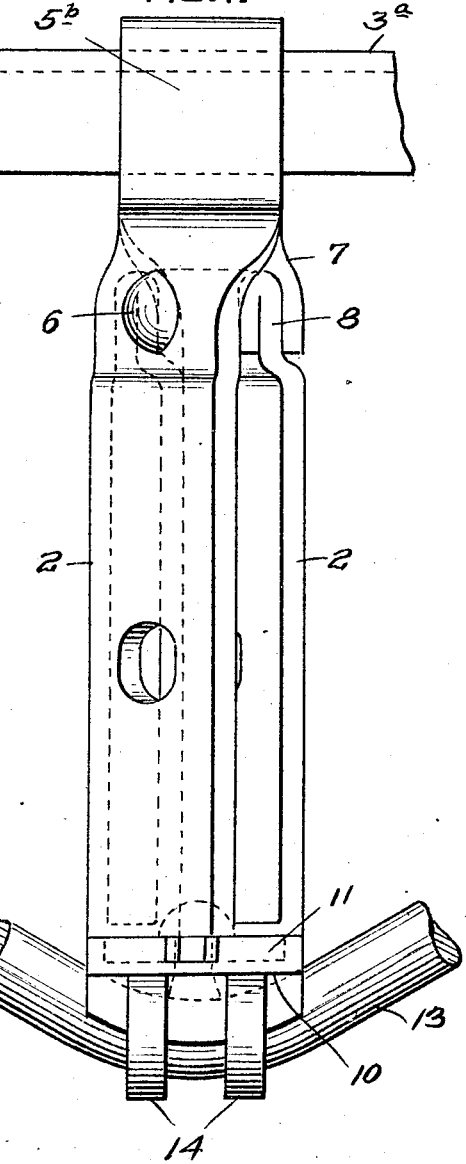
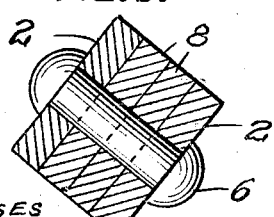

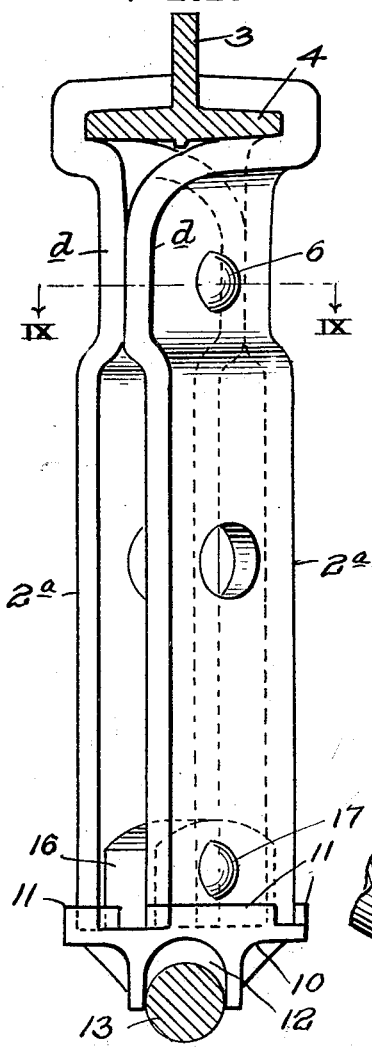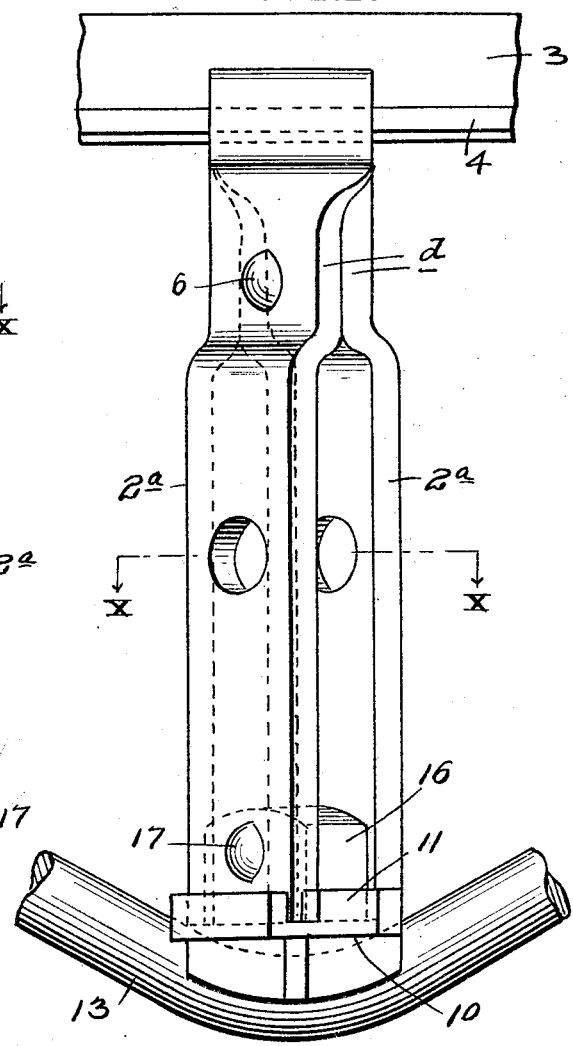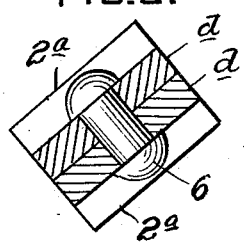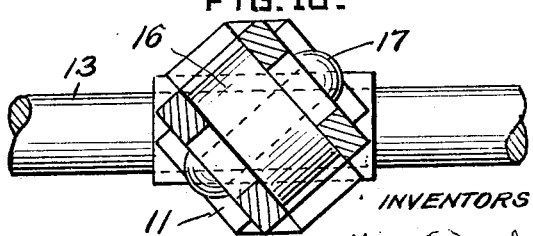

Patented Feb. 10, 1925.

1,526,058

UNITED STATES PATENT OFFICE.

WILLIAM E. FOWLER, JR., OF MOUNT LEBANON, AND CHARLES F. PERKINS, OF JOHNSTOWN, PENNSYLVANIA, ASSIGNORS TO DAVIS BRAKE BEAM COMPANY, OF JOHNSTOWN, PENNSYLVANIA, A CORPORATION OF PENNSYLVANIA.

BRAKE BEAM.

Application filed July 2, 1923. Serial No. 648,967.

*To all whom it may concern:*

Be it known that we, WILLIAM E. FOWLER, Jr., and CHARLES F. PERKINS, residing at Mount Lebanon and Johnstown, respectively, in the counties of Allegheny and Cambria, respectively, and State of Pennsylvania, citizens of the United States, have invented or discovered certain new and useful Improvements in Brake Beams, of which improvements the following is a specification.

The invention described herein relates to certain improvements in truss brake beams, the invention being particularly directed to the strut member of such beams. The invention has for its object a construction of strut consisting of two substantially parallel members or legs, said legs being provided at one end with hooks or bent portions adapted to engage the compression member of the beam, said member having what is known as a structural shape in cross section. It is a further object of the invention to secure on the opposite end of the strut a cap provided with a saddle for the tension member of the beam. The invention is hereinafter more fully described and claimed.

Figure 1:
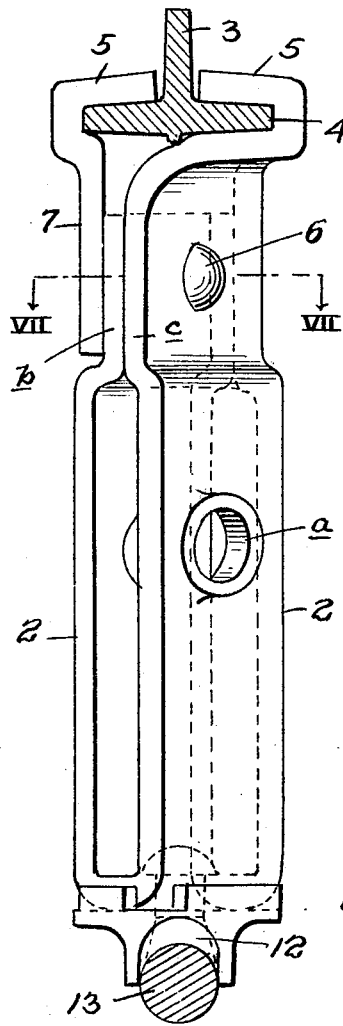
Figure 2:
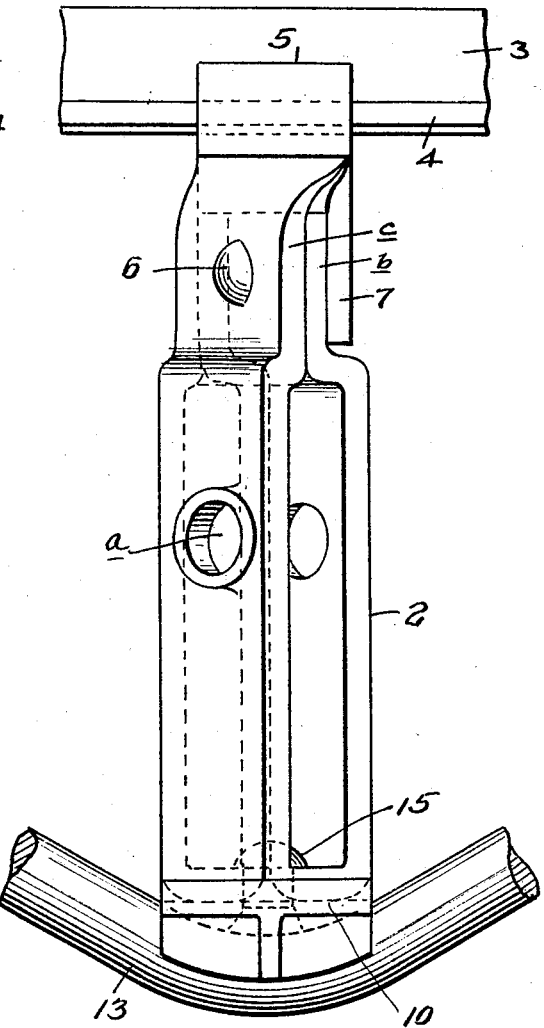
Figure 7:
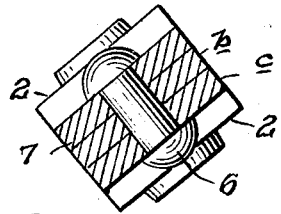

In the accompanying drawings forming a part of this specification, Figs. 1 and 2 are elevations (the views being at right angles one to the other), of portions of a truss brake beam embodying the improvements claimed herein; Figs. 3, 4, and 5 and 6 are views similar to Figs. 1 and 2 illustrating certain modifications in the construction of strut; Fig. 7 is a transverse section taken on a plane indicated by the line VII—VII, Fig. 1; Figs. 8 and 9 are sections taken on planes indicated respectively by the line VIII—VIII, Fig. 3 and the line IX—IX, Fig. 5, and Fig. 10 is a sectional plan view of the cap having the saddle for the compression member.

The improved strut or fulcrum bar is preferably formed by bending a flat strip of metal of suitable thickness to a U-shape, as shown in Figs. 1 to 4, but may be also formed of two independent strips. The legs 2 at one end of the strut are provided with means suitably shaped to engage the compression member. As for example, when the compression member is of a T or I shape, consisting of a web 3 and oppositely disposed flanges 4 along one edge of the web, as shown in Figs. 1 and 2, it is preferred that the engagement of the strut with the compression member be effected by hooks 5 adapted to be slid in opposite directions onto the flanges 4 and bear firmly against the edges thereof. The same construction may be employed for connecting the strut to a channel shaped compression member as shown in Figs. 3 and 4, but in such case the shanks $5^b$ of the hooks are made of such length that the hooks will overlap the webs $3^a$ of the channel. The hooks are drawn and held in engagement with the compression member by means of a bolt or rivet 6 passing through the legs a suitable distance above the hooks and to prevent the legs being so drawn towards each other by the bolt or rivet as to interfere with the free movement of the lever, which is mounted, as usual, on a pin passing through holes $a$ in the legs of the strut, suitable leg spacing means being employed.

In the construction shown in Figs. 1 and 2 and 3 and 4, one of the hooks 5 is formed integral with a leg of the strut and the other hook 5 is formed of an independent piece of metal 7, which is secured to the strut and drawn into engagement therewith by the bolt or rivet 6. When only one of the hooks is formed integral with one of the legs, the end portion 8 of the other leg is bent inwardly and onto the adjacent portion of the other leg to form a spacer to prevent the legs being bent inwardly when applying the bolt or rivet 6, as shown in Figs. 3 and 4. In lieu of forming a spacer by bending the end of one leg back onto the leg, as above stated, both legs may be bent inwardly so that the inwardly bent portions $b$ and $c$ will bear against one another, as shown in Figs. 1 and 2, while the remaining portions of the legs are substantially parallel.

In the construction shown in Figs. 5 and 6, the strut is formed by two independent strips of metal $2^a$. The desired spaced relation of the portions of the legs between which the lever operates, is maintained at one end by bending in the legs adjacent to the hooked ends to form abutments $d$, through which the connecting bolt or rivet 6 is passed.

On the outer end of the strut is placed a block 10 having on one side flanges 11 adapted to extend short distances down along the sides of the strut. The outer side of this cap shaped block has formed thereon concave seat 12 for the tension member 13 of the truss. If desired, suspension lugs 14 may be formed on the cap which is secured in position by a rivet or bolt 15.

In the construction shown in Figs. 5 and 6, the block 10 is formed with a projection 16 adapted to project between the ends of the legs 2$^a$ and maintain the same in the desired spaced relation, and in order to secure the block or cap in position, the flanges 11 which overlap the ends of the legs 2$^a$ are extended sufficiently to permit of a bolt 17 being passed through said flanges, through the legs and the spacing projection 16.

It is characteristic of the strut or fulcrum bar that in the constructions shown in Figs. 1 to 4, the means employed for maintaining intermediate portions of the legs in spaced relation, are integral with the legs. At one end the legs are bent to provide abutments for such spacing means while at the saddle end of the strut the legs are integrally connected in the desired spaced relation. In the constructions shown in Figs. 5 and 6, the spacing at the saddle end is effected by a projection on the block carrying the saddle for the tension member, but at the opposite end the spacing means is formed by bending the legs as described.

We claim herein as our invention:

1. A fulcrum bar for brake beams having in combination a U-shaped member provided at its free end with oppositely disposed hooks adapted to grip the compression member of a brake beam truss, and a cap riveted to the closed end of the member and provided with flanges overlapping opposite sides of said member to hold the cap as against rotation on the member and provided with a seat for the tension member of the truss.

2. A truss brake beam having in combination a compression member, a tension member and a strut consisting of spaced legs provided at one end with oppositely disposed hooks adapted to engage the compression member, one of said hooks being integral with one of the legs of the strut and the other being formed independent of the strut, means for securing the independent hook to the strut and drawing both hooks into engagement with the compression member, and means for maintaining portions of the legs in spaced relation.

3. A truss brake beam having in combination a compression member, a tension member, a strut consisting of spaced legs one of the legs having an extension provided with a hook adapted to engage the compression member, and the shorter leg being bent inwardly to bear against the longer member to maintain the portions of the legs between which the lever operates in spaced relation, a hook formed independent of the legs and means for securing the independent hook to the strut and drawing both hooks into engagement with the compression member.

4. A fulcrum bar for truss brake beams having in combination a strut consisting of legs provided with oppositely disposed hooks adapted to engage the compression member, one of said hooks being independent of the legs, means integral with the legs for maintaining intermediate portions thereof in spaced relation, and means for drawing the hooks into engagement with the compression member.

5. A fulcrum bar for truss brake beams consisting of legs provided with oppositely disposed hooks adapted to engage the compression member, one of said hooks being independent of the legs, portions of said legs adjacent to the hooks being constructed to bear one against the other to maintain intermediate portions of the legs in spaced relation, and means for drawing the hooks into engagement with the compression member.

6. A fulcrum bar for truss beams having in combination a U-shaped member oppositely disposed hooks for connecting the U-shaped member to the compression member of a brake beam truss, one of said hooks being integral with one of the legs of the U-shaped member and the other hook independent of said member, means for securing the independent hook to second member and drawing both hooks into engagement with the compression member and means for holding the intermediate portions of the U-shaped members in spaced relation.

7. A fulcrum bar for truss brake beams having in combination a U-shaped member, oppositely disposed hooks for connecting the U-shaped member of the compression member of brake beam trusses, one of said hooks being integral with one of the legs of the U-shaped member and the other hook independent of said member, means for securing the independent hook to the second member and drawing both hooks into engagement with the compression member and a spacer interposed between the legs of the U-shaped member, said spacer being formed integral with a leg of the U-shaped member.

8. A fulcrum bar for truss brake beams having in combination a U-shaped member, one of the legs of such member having a hook integral therewith, and the end of the other leg being shaped to form a spacing element between the legs, a second hook formed independent of the U-shaped member, and means for securing such hook to the member and drawing both hooks into engagement with the compression member of a brake beam.

9. A truss brake beam having in combination a compression member having oppositely disposed flanges, a U-shaped fulcrum bar, the free ends of the legs of such bar being provided with oppositely disposed hooks engaging the flanges of the compression member, a bolt passing through the legs of the fulcrum bar to hold said hooks in engagement with the flanges, a cap provided with flanges overlapping the opposite sides of the fulcrum bars adjacent to its end and provided with a concave seat, and a tension member having its ends connected to the compression member and seated on the cap.

In testimony whereof, we have hereunto set our hands.

WILLIAM E. FOWLER, Jr.
CHARLES F. PERKINS.